Figure 1:
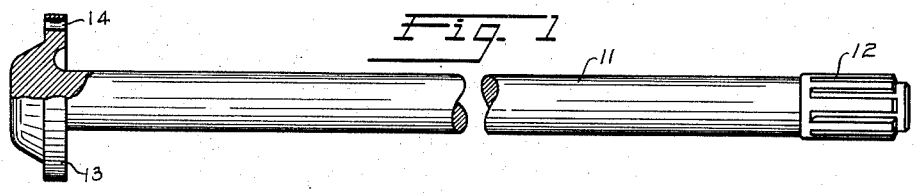

June 10, 1952  M. B. MORGAN  2,599,575
SHAFT
Filed Feb. 14, 1945

SHAFT DIAMETER

MATHEW B. MORGAN
INVENTOR

BY Strauch & Hoffman
ATTORNEYS

Patented June 10, 1952

2,599,575

UNITED STATES PATENT OFFICE 2,599,575

SHAFT

Mathew B. Morgan, Detroit, Mich., assignor to The Timken-Detroit Axle Company, Detroit, Mich., a corporation of Ohio Application February 14, 1945, Serial No. 577,756

4 Claims. (Cl. 64—1)

This invention relates to shafts which are subjected to torsional stresses, such as full-floating drive axle shafts or other drive or propeller shafts for power driven vehicles, and particularly to such shafts having improved torsional fatigue resisting properties.

This is a continuation-in-part of my co-pending application Serial No. 387,329 filed April 7, 1941, now abandoned.

In service, automobile drive axle shafts are subjected to sudden torsional loads, and it has been found highly desirable to design these shafts with a certain amount of permissible torsional "wind-up" by which they twist slightly and resiliently absorb and cushion and redistribute sudden torsion stress changes. Both mechanical design and choice and treatment of material are basic considerations. The present invention is chiefly concerned with special shaft construction arising from novel hardness distribution characteristics provided in shafts made of plain medium carbon steel which renders them even more reliable and efficient for drive axle purposes than the far more expensive known used alloy steel shafts.

With present day increases in vehicle speed, weight and load capacity, and demands for reliable and long-lived performance, the improvement of vehicle drive axle shafts has been the subject of continual research. In this research, it was generally concluded by most automobile manufacturers, prior to this invention, that plain ordinary carbon steel was unsuitable for drive axle shafts, particularly if they were to satisfactorily withstand the severe conditions imposed upon them in modern heavy duty services, and it was further concluded that the use of alloy steel shafts was necessary to provide the toughness and durability required for such shafts.

According to an authoritative paper of John Younger, published in volume 37 of the 1916 "Transactions of the American Society of Mechanical Engineers," the automotive industry had by 1915 largely adopted alloy steel for making automobile drive axle shafts. This paper stated that the most satisfactory steel for axle shafts then was a nickel-chromium alloy containing .30% carbon, .50% manganese, 1.5% chromium and 3.5% nickel. These alloy steel shafts were deep hardened shafts heat treated and tempered to have a final hardness of some 402–444 Brinell. More recently it has been considered by many that comparatively high priced S. A. E. 4340 chrome-nickel-molybdenum steel was the best material to be used for full-floating drive axle shafts. This provides a deep hardening alloy steel shaft which, when tempered to a surface hardness of 400–444 Brinell as is usually done in practice, is of substantially the same hardness throughout its section.

For added strength the surface region of such alloy shafts may be made harder than the center. For this type of alloy steel, the shaft is subjected to a heat and a quench in the regular manner, which results in a hardness of 400–444 Brinell throughout, followed by a quick heat to high temperature and quenching. This procedure results in a deep hardened shaft having approximately a ⅛ to ¼ inch hardened surface ring of 500–600 Brinell hardness. Since this method requires the use of expensive steel and tempering procedure, it has been used only on highly stressed shafts for special applications.

Some manufacturers, on the other hand, in spite of the above have continued to make drive axle shafts of plain medium carbon steel. To my knowledge, prior to this invention, a representative one of these manufacturers considered it essential to temper these shafts to provide a surface hardness in the range of 387 to 444 Brinell or lower, apparently believing in accord with the then accepted practices and theories in the art that higher hardness made the shafts so brittle as to reduce their resistance to torsional fatigue, and I understand that this tempering procedure to obtain similar hardnesses was common to all. To my knowledge no untempered plain medium carbon steel drive axle shafts of maximum surface hardness have been proposed or used prior to the invention.

The tendency, moreover, prior to my invention, was for carbon steel shafts to be heat treated to have still lower hardness values. For example, the paper of C. W. Spicer, entitled "Torsional Strength of Multiple Splined Shafts," published in the "Transactions of the Society of Automotive Engineers" for 1921, Part I, Volume XVI, pages 391–396, discusses tests of carbon steel shafts which had hardness values ranging from 220 to 235 Brinell.

Notwithstanding the foregoing previous beliefs and practices, I have discovered that shafts which are subjected substantially only to torsional stress, such as full-floating axle drive shafts, automotive propeller shafts, etc., when made of shallow hardening steels such as plain ordinary inexpensive medium carbon steel and heat treated to obtain substantially the maximum hardness obtainable at the surface, and gradually decreasing in hardness to a materially softer center, actually perform better than the best alloy steel shafts heretofore manufactured in automotive service. Since commercially available plain carbon steel has been found in practice to be relatively non-uniform in composition especially in different batches, I have found it further desirable in one phase of the invention to treat it with a deoxidizing or cleaning mix to produce improved uniformity of grain structure and size and similar characteristics over commercial grade carbon steel and to obtain uniformity in steel of different batches.

It is accordingly a major object of my invention to provide a novel, inexpensive torsional power transmitting shaft made of a shallow hardening plain medium carbon steel which is hardenable to a high exterior hardness gradually decreasing to a very much softer interior, the shaft being ductile and having superior strength and resistance to failure under repeated severe torsional stresses.

Another important object of my invention is to provide a novel, inexpensive ordinary medium carbon steel drive shaft which has torsional fatigue resistant properties exceeding those of more expensive alloy steel shafts.

It is another object of my invention to provide a novel, plain medium carbon steel shaft for torsional transmission of power, the shaft having an exterior hardness exceeding that previously used in carbon steel drive shafts, and with a hardness gradually decreasing inwardly to a substantially softer center whereby the shaft has superior resistance to fatigue from repeated torsional stresses.

Another object of my invention is to provide a novel, plain carbon steel drive shaft having a constant maximum hardness in a shallow outer annular region which gradually and materially decreases toward the center.

A further object of the invention is to provide a novel, torsional fatigue resistant shaft having a shallow exterior annulus of substantially constant hardness and of gradually decreasing hardness inwardly to a materially softer center.

A further object of the invention is to provide a novel, plain medium carbon steel shaft having a carbon content of about .38 percent to .50 percent, a relatively shallow exterior annular region with a high hardness of about 50 to 60 Rockwell C, a center region with a materially lower hardness of about 20 to 35 Rockwell C, and of gradually changing hardness between said regions.

Figure 2:
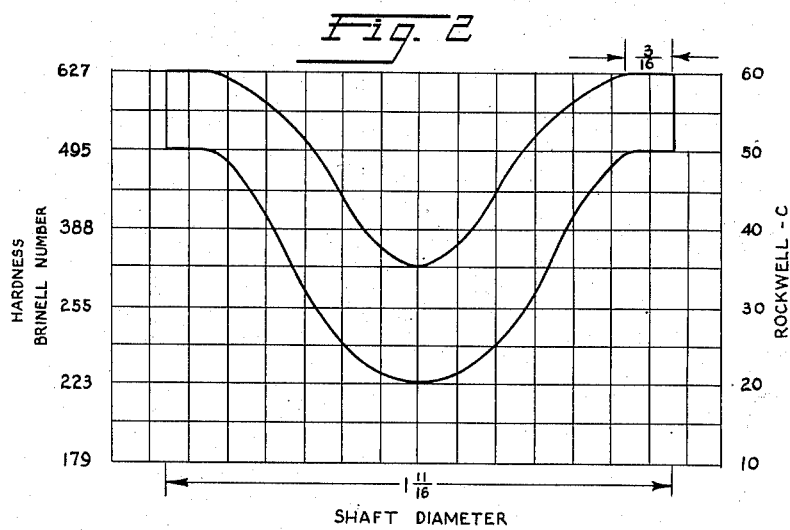

Further objects of the invention will become apparent as description of the invention proceeds in connection with the appended claims and the annexed drawings wherein:

Figure 1 is a side elevation of an automotive axle drive shaft of the type in which my invention is preferably embodied; and Figure 2 is a chart illustrating the limits and gradient of hardness across a diameter of a shaft such as shown in Figure 1 contemplated according to my invention.

The drive shaft shown in Figure 1 is an example of a full-floating automotive drive axle shaft to which my invention is particularly adapted. This shaft has a long body 11 which is usually of substantially constant diameter. At one end is a splined formation 12 designed to fit into a female spline of a differential side gear. The other end of the shaft is preferably provided with a flange 13 having a series of holes 14 provided therein for bolts which attach the flange to a wheel hub rotated about and supported on the axle housing. An axle driving a wheel supported in this manner is known as a full-floating axle, and is subjected substantially only to torsional stresses.

In order to make a shaft having desired hardness characteristics according to the invention when heat treated, a shallow hardening steel is used. A shallow hardening steel within the meaning herein used is one which when heated above its critical range and then quickly quenched will have maximum hardness value at its exterior. This hardness decreases to a substantially lower hardness at the center. Such steels are distinguished from deep hardening alloy steels which have substantially the same hardness throughout, or do not differ greatly in hardening throughout when hardened by a similar heat treatment.

According to my invention I use a plain medium carbon steel having a carbon content of about .38% to .50% with the constituents other than iron being present in amounts insufficient to take the steel from the plain carbon steel class. If the other constituents happen to be usual alloy steel ingredients, as is often the case at the present time, they may be present only in proportions far short of alloy steel proportions for purposes of the invention. I have found it advisable to use for purposes of the invention only such commercial medium carbon steels wherein any alloy steel ingredients such as nickel, chromium, etc. are not present in amounts greater than .2 of one percent of each.

S. A. E. 1045 plain carbon steel is a representative example of a suitable shallow hardening plain medium carbon steel which can be heat treated to have the required high exterior hardness and decreasing interior hardness by heating to about 1550° F. and quickly quenching in a water or caustic solution bath. This steel which I have satisfactorily used in the invention is usually of substantially the following analysis when no alloy scrap is included:

| | |
|---|---|
| Carbon | .43–.50% |
| Manganese | .60–.90% |
| Silicon | .15–.30% |
| Phosphorus | .040 maximum % |
| Sulphur | .05 maximum % |
| Iron | Balance |

Another plain medium carbon steel which I have found satisfactory for purposes of the invention is the present commercial grade of S. A. E. 1046 which has a manganese content of about .70% to 1.00%.

I have found that a plain carbon steel shaft heat treated to provide hardness characteristics illustrated in Figure 2 has torsional impact and fatigue resistant properties superior to more expensive alloy steel shafts.

The chart of Figure 2 illustrates the practical zone limits and general gradient of hardness across a diameter of a plain carbon steel drive axle shaft according to the invention. Since plain carbon steel is not commercially available with accurate uniformity of composition and structure, it is apparent that substantially the same heat treatment of different non-uniform batches may give different hardness characteristics. The indicated zone of Figure 2, however, has been formulated for adequate definition of the invention, and is based on test results and prediction coupled with experience.

The individual hardness gradient curves for different carbon steel shafts of the same diameter as that of the example of Figure 2 will lie substantially within the indicated zone of Figure 2. Where the steel is of non-uniform grain size and structure and other characteristics affected by heat treatment, the individual curve therefor may approach more a U-shape, possibly even departing slightly from the zone in extreme cases in the region intermediate the exterior uniformly hard annular region and the center of the shaft. For uniform grade plain carbon steels, and especially those treated by special deoxidizing or cleaning mixes as will be later described, the individual curves will more closely approximate a V-shape conforming to the average of the zone. This V-shape of the hardness curve is preferable because the curve of stress distribution across the shaft diameter is in general of similar shape with the greater stress adjacent the shaft surface, and correlation of hardness and stress distribution across the shaft in this manner greatly improves the torsion fatigue resisting properties of the shaft.

For shafts of different diameters, the zone shape of Figure 2 will be similar and generally proportional. The particular shaft diameter illustrated in Figure 2 is 1 1/8 inches, and drive axle shafts according to the preferred embodiment of the invention range mainly between 1 7/16 to 3 inch diameters.

The hardness zone of Figure 2 establishes a maximum outer region hardness of approximately 50 to 60 Rockwell C (about 495–627 Brinell) in a shallow annular region where the hardness is uniform for a definite depth and the hardness decreases gradually from that region toward the center region where it is materially lower, approximately 20 to 35 Rockwell C (about 220–330 Brinell). These outer and center region limits prevail in all shafts of the invention, although as above explained there may be small departures from the zone intermediate those regions, as for example when the carbon steel of the shaft contains such impurities as alloy scrap now present in much of the currently received commercial grade alleged plain carbon steels. For the commercial grades of plain carbon steels available before the recent war, the hardness limits at the center shaft region could be restricted at least to 20 to 30 Rockwell C, but the higher limit of 35 Rockwell C is believed necessary to include such commercial grade plain carbon steels containing small scrap alloy contents as I have found are usable in the invention.

For shafts of the range 1 7/16 to 3 inch diameters, the outer maximum hardness region is an annulus of about 3/16 inches, having substantially uniform hardness throughout.

The above mentioned non-uniformity in commercial plain carbon steels may be corrected and compensated by adding to the steel prior to making the shafts a deoxidizing mix of alloying elements comprising, by way of example, approximately the following proportions:

| | Per cent |
|---|---|
| Vanadium or zirconium | 25 |
| Titanium | 15 |
| Aluminum | 10 |
| Iron | 50 |

This mix is added to plain medium carbon steel in the proportion of approximately four pounds of the mix to one ton of steel, the addition preferably being made in the ladle after pouring from the open hearth furnace. Starting with commercial S. A. E. 1045 steel, the final product is a plain medium carbon shallow hardening steel which has substantially uniform grain structure and size, and is capable of being made into shafts of the required hardness characteristics.

This steel, which may be simply designated as the commercial grade steel cleaned of impurities which interfere with uniform hardness characteristics, is sometimes known as addition agent steel, since the percentage of the mix added is too small for the steel to be considered as an alloy steel or to make it a deep hardening steel. A treated steel of this kind found satisfactory in the invention has the following analysis:

| | |
|---|---|
| Carbon | .38 to .45% |
| Manganese | .60 to .80% |
| Chromium | .15% max. |
| Molybdenum | .05% max. |
| Nickel | .20% max. |
| Sulphur and phosphorus | .04% max. |
| Silicon | .20 to .35% |
| Traces of Al, Ti and Va | .05% |

It is fine grain and normal, uniform, and crystalline in structure, and has the same shallow hardness properties as good grade plain carbon steel. When axle shafts made of this cleaned steel are hardened in the usual manner, more uniform and similar hardness characteristics are obtained in shafts of different heats, thereby increasing control over manufacture of the shafts.

Other materials and mixes than those above specified may be used for cleaning the steel for purposes of the invention. For example, I may use to this end any of the mixes described in United States Letters Patent No. 2,291,842 to Strauss, wherein a similar treatment of alloy steels is disclosed.

In making the shaft of Figure 1, the shaft is preferably forged to shape from the aforesaid plain medium carbon steel, machined to provide gear teeth and splines, and prepared for eventual heat treatment.

The shaft is then heat treated. It is heated to about 1550° F. and held at that temperature for about 10 to 15 minutes. It is then simply quenched in a 10% solution of sodium hydroxide in water, or in plain water, so as to obtain maximum surface hardness.

Shafts produced in the above manner and not subjected to drawing have hardness characteristics as shown in Figure 2. I believe that the invention provides for the first time untempered shafts having the specified hardness characteristics and sufficient ductility to be capable of use as automotive drive axle shafts.

Test carbon steel axle shafts made as described above have been furnished as replacements in buses wherein the aforementioned deep hardening S. A. E. 4340 alloy steel axles tempered to a hardness of 400–444 Brinell have failed at an average of 56,000 miles. To date none of these carbon steel axles have broken, although having been driven an average of 79,200 miles. To further test the carbon steel axle shafts of the invention a test machine was built which tests the shafts under reversing torsional loads only, to compare their torsional fatigue resistance with S. A. E. 4340 alloy steel axle shafts. The alloy steel axle shafts failed at an average of 117,165 cycles or reversals in stress, whereas the carbon steel axle shafts survived 250,000 cycles without failure. The above demonstrates the advantage of shafts of the invention over alloy steel shafts.

Below is a table setting forth relative test results prepared for comparison of untempered plain carbon steel drive axle shafts of the invention with plain carbon steel drive axle shafts tempered to lower surface hardnesses as required in the industry prior to the present invention, for showing advantages of the invention over such prior tempered shafts. All were made of S. A. E. 1045 commercial steel.

| Shaft No. | Heat Treatment | Surface Hardness Brinell | Torsion Cycles | Failures |
|---|---|---|---|---|
| 1 | Std. Production (Drawn) | 401 | 80,356 | Broke 11½ in. from flange. |
| 2 | do | 415 | 62,555 | Broke at center of body. |
| 3 | do | 388 | 69,877 | Broke 12 in. from flange. |
| 4 | do | 388 | 19,599 | |
| 5 | do | | 39,668 | Broke at center of body. |
| 6 | do | 388 | 40,171 | Body badly cracked. |
| Average | | 396 | 52,037 | |
| 1 | Not Drawn | 602 | 259,600 | Broke at center of body—Flaw. |
| 2 | do | 602 | 100,230 | Broke at center of body—Flaw. |
| 3 | do | 602 | 275,200 | Test stopped, shaft did not fail. |
| 4 | do | 602 | 250,824 | Cracked but still holds load. |
| Average | | 602 | 221,464 | |

The shallow hardening untempered plain medium carbon steel shafts having hardness characteristics in accordance with my invention in both laboratory and road tests have proved to be superior to shafts made of alloy steel and tempered plain carbon steel shafts. Furthermore, my improved shafts can be produced at a final cost lower than the cost of either chiefly by reason of elimination of the more expensive heat treatments and alloy materials. While fully floating automotive axle shafts are one important example of the use of torsion shafts embodying my invention, it is to be understood that they are suitable for other uses where they are subjected substantially only to torsional stresses.

The surprising results obtained as a result of my discovery are of particular value at this time because the need in torsional shafts for comparatively scare and more valuable alloy metals useful for other war purposes is eliminated thereby.

The invention may be embodied in other specific forms without departing from the spirit or essential characteristics thereof. The present embodiments are therefore to be considered in all respects as illustrative and non-restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. As a finished article of manufacture, a heat treated solid plain medium carbon steel drive shaft of high ductility and improved resistance to torsional fatigue having a carbon content of approximately .38 to .50 percent, a relatively shallow annular exterior region with a substantially constant hardness throughout of approximately 50 to 60 Rockwell C and an interior gradually decreasing in hardness from said region toward a materially lower hardness of approximately 20 to 35 Rockwell C at the center region of the shaft.

2. A drive construction comprising a splined power transmitting member, a flanged driven member, and a drive axle having a splined driving connection at one end and a mounting flange at its opposite end connected, respectively, to said power transmitting member and said driven member, said drive axle being composed of a heat treated solid plain medium carbon steel having a carbon content of approximately .38 to .50 percent, and having a relatively shallow annular exterior region with a substantially constant hardness throughout of approximately 50 to 60 Rockwell C and an interior gradually decreasing in hardness from said region toward a materially lower hardness of approximately 20 to 35 Rockwell C at the center region of the axle thereby providing an axle having high ductility and improved resistance to torsional fatigue.

3. For use in a drive construction including a power transmitting member and a driven member; a drive shaft, having driving connections at its opposite ends for connection, respectively, to said power transmitting member and said driving member, composed of a heat treated solid plain medium carbon steel having a carbon content of approximately .38 to .50 percent, and having a relatively shallow annular exterior region with a substantially constant hardness throughout of approximately 50 to 60 Rockwell C and an interior gradually decreasing in hardness from said region toward a materially lower hardness of approximately 20 to 35 Rockwell C at the center region of the shaft thereby providing an axle having high ductility and improved resistance to torsional fatigue.

4. As a finished article of manufacture, an elongated vehicle drive axle shaft of substantially circular cross-section having at one end an integral radially projecting bolting flange for attachment to a vehicle wheel and having its other end splined for attachment to a drive mechanism, said axle shaft being a heat treated solid plain medium carbon steel shaft of high ductility and improved resistance to torsional fatigue having a carbon content of approximately .38 to .50 percent, a relatively shallow annular exterior region with a substantially constant hardness throughout of approximately 50 to 60 Rockwell C and an interior gradually decreasing in hardness from said region toward a materially lower hardness of approximately 20 to 35 Rockwell C at the center region of the shaft.

MATHEW B. MORGAN.

REFERENCES CITED

The following references are of record in the file of this patent:

UNITED STATES PATENTS

| Number | Name | Date |
|---|---|---|
| 2,204,209 | Davenport | June 11, 1940 |
| 2,291,842 | Strauss | Aug. 4, 1942 |

OTHER REFERENCES

Metals Handbook, 1939 edition, pages 953–958, 975–978.